INVENTORS:
EDWARD M. LEVY
PERRY SWAN

July 11, 1961 E. M. LEVY ET AL 2,991,889
MERCHANDISE DISPLAY ASSEMBLY
Filed April 15, 1959 6 Sheets-Sheet 6

INVENTORS:
EDWARD M. LEVY
PERRY SWAN

United States Patent Office 2,991,889
Patented July 11, 1961

2,991,889
MERCHANDISE DISPLAY ASSEMBLY
Edward M. Levy, Evanston, and Perry Swan, Chicago, Ill., assignors to Reflector-Hardware Corporation, Melrose Park, Ill., a corporation of Illinois
Filed Apr. 15, 1959, Ser. No. 806,695
8 Claims. (Cl. 211—177)

This invention relates to merchandise display equipment, and more particularly to self-contained and self-supporting assemblies or units which may easily and quickly be erected for use in retail stores and other places of business for the advantageous display of merchandise.

In modern retail establishments and in other places of business it is often desirable to provide merchandise display fixtues or furnishings of the type comprising a raised platform resting upon the floor for supporting merchandise of various kinds, together with facilities above the platform for supporting other merchandise thereabove. Such fixtures or furnishings sometimes comprise an "island" structure made up of a raised platform or base disposed in a relatively open floor area of the store or place of business, with an upstanding wall or panel extending upwardly from the approximate longitudinal center-line of the raised platform. An island of this kind is normally located so that customers may pass along either side thereof and inspect any merchandise that may be resting upon the floor of the raised platform on either side of the upstanding wall thereon, or inspect any merchandise that may be supported upon any of the great variety of racks, hooks or shelves that may be attached to the opposite sides of the wall. Similarly, in other retail or business installations a raised platform is sometimes built on the floor along an existing or a specially built wall so that merchandise may be displayed both on the platform and on racks and other supports mounted on the wall above the platform. In either case, however, it will be appreciated that display fixtures of this kind have heretofore been more or less of a permanent nature in that, for the most part, they have been custom built and installed at the site as an integral part of interior decoration and furnishing of the business or display space.

Merchandise display "islands" of the kind just referred to, as well as the display installations comprising a raised platform built along the base of a wall, are of considerable aid in merchandising various kinds of goods, but their construction and installation have heretofore been quite expensive because of the labor involved. In the past, the installation of such islands and platforms has, in effect, involved what would normally be considered to be an actual remodeling of the store or display space and has required the services of skilled carpenters, cabinet makers, and the like. Because of this expense, many stores and business houses have refrained from having such installations made, and others who have made the installations have refrained from moving or rearranging them even though rearrangement from time to time is often desirable in order that the display space may always have a new and fresh appearance.

One of the principal objects of the present invention is to provide self-contained and self-supporting display assemblies that may be quickly and easily assembled by unskilled persons without the use of tools, to provide merchandise display "islands" of the general type referred to above as well as the platform and upstanding wall arrangements just discussed. It will be apparent, as the description of the present invention proceeds, that the present "island" and platform and wall assemblies may be erected in a matter of minutes by persons of little or no experience, but yet the structures are of great strength and give the appearance of custom made and custom installed store fixtures. Because of the ease and speed with which the structures of the present invention may be assembled and disassembled, their installation in a store or place of business is relatively very inexpensive. Similarly, they may quickly and easily be rearranged from time to time so that, at little or no cost to the store owner, he can in effect remodel his store or display space so as always to provide an arrangement best suited to the particular merchandise then being stressed by him.

Another object of the invention is to provide a display assembly of the character just stated having a base platform and a generally vertical wall or panel thereon, wherein the assembly requires no support from other walls, posts or ceilings, so that the assembly may be erected at any location desired without regard to the permanent walls and other features of the particular room or space in which the assembly is used. Still another object of the invention is to provide a display assembly having the aforesaid features and which may be indefinitely extended by joining together, side by side, like units so as to provide, if desired, an entire false wall for displaying merchandise and having along its base, on one or on both sides of the wall, a raised display platform or platforms. Because the present assemblies are self-contained and fully self-supporting, and because the assemblies may be extended to any desired length merely by joining together any desired number of like units, the assemblies may be used as merchandise displaying false walls to represent the four walls of a room, or they may be used as islands or as dividers within a room. In all such uses the assemblies provide strong and attractive upright walls upon which merchandise may be supported by any of a great variety of racks, hooks, shelves and the like, and at the base of each upright wall there is provided a raised platform of uniform height that may be utilized merely for decorative purposes or for the support of other merchandise.

Still another object of the invention is to provide highly improved standards or upright posts for supporting merchandise and having a novel construction for removably retaining panels therebetween.

These and other objects and advantages of the present invention will be understood from the following description of certain preferred embodiments thereof, taken with the accompanying drawings, wherein.

In FIGS. 1–11 and 18 the invention as illustrated as applied to self-supported display apparatus of the island type, both sides of which are intended to be used to display merchandise, whereas in FIGS. 12–17, 19 and 20 the invention is illustrated as applied to two further embodiments of the display apparatus which are self-supported but which are intended to stand, for example, adjacent an existing wall or other obstacle, only the front side of the apparatus being intended to display merchandise. As will subsequently become apparent, many important features of the invention are common to these three illustrated applications of the invention.

Figures 1, 2, 20:
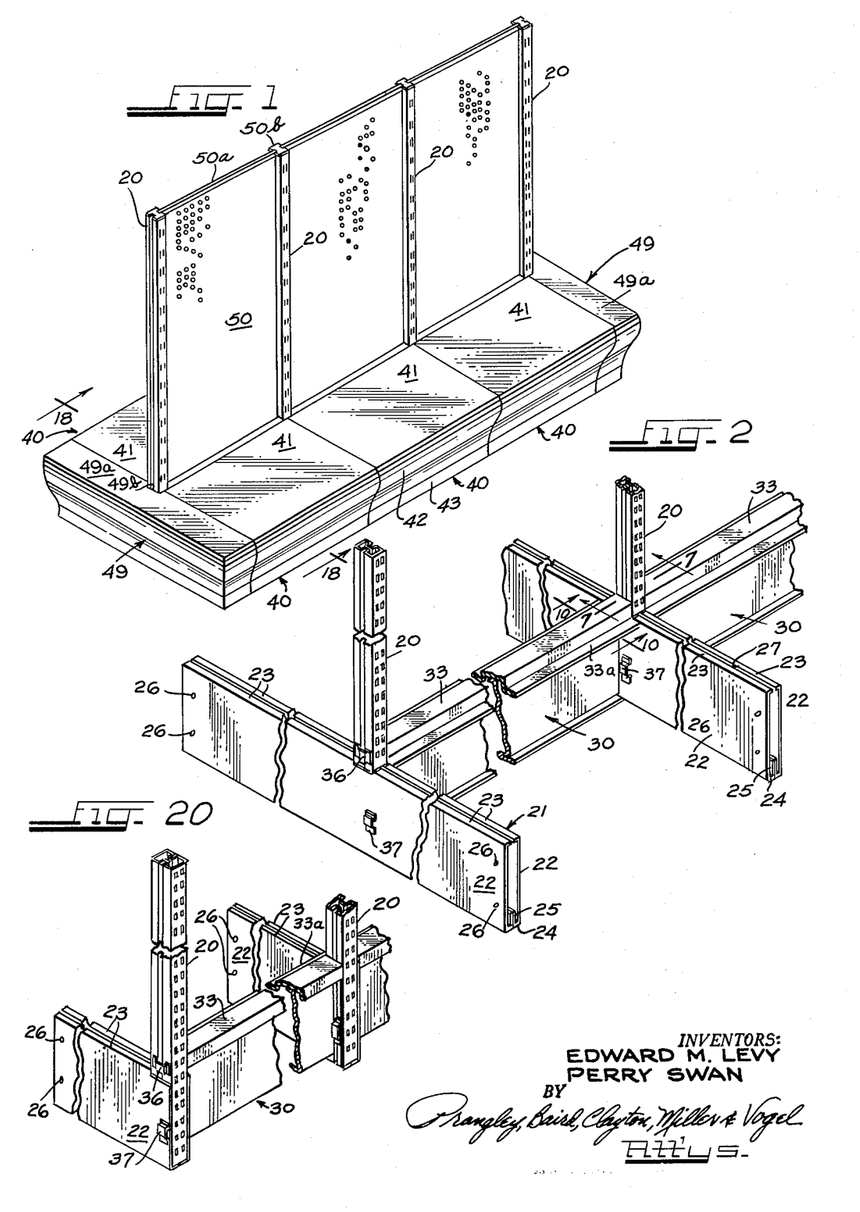
FIG. 1 is a perspective view of one form of the apparatus of the present invention in an "island" arrangement suitable for disposition in any open floor area of a store or place of business.
FIG. 2 is a perspective view of a portion of the frame of the apparatus of FIG. 1.
FIG. 20 is a view similar to FIG. 2 but showing the framing for a modified structure similar to that of FIG. 2 adapted to be disposed, for example, adjacent an existing wall so that, instead of providing an island having a base platform on opposite sides of the upright panel, the assembly will provide a base platform only on one side of the panel.
Figures 12, 13:
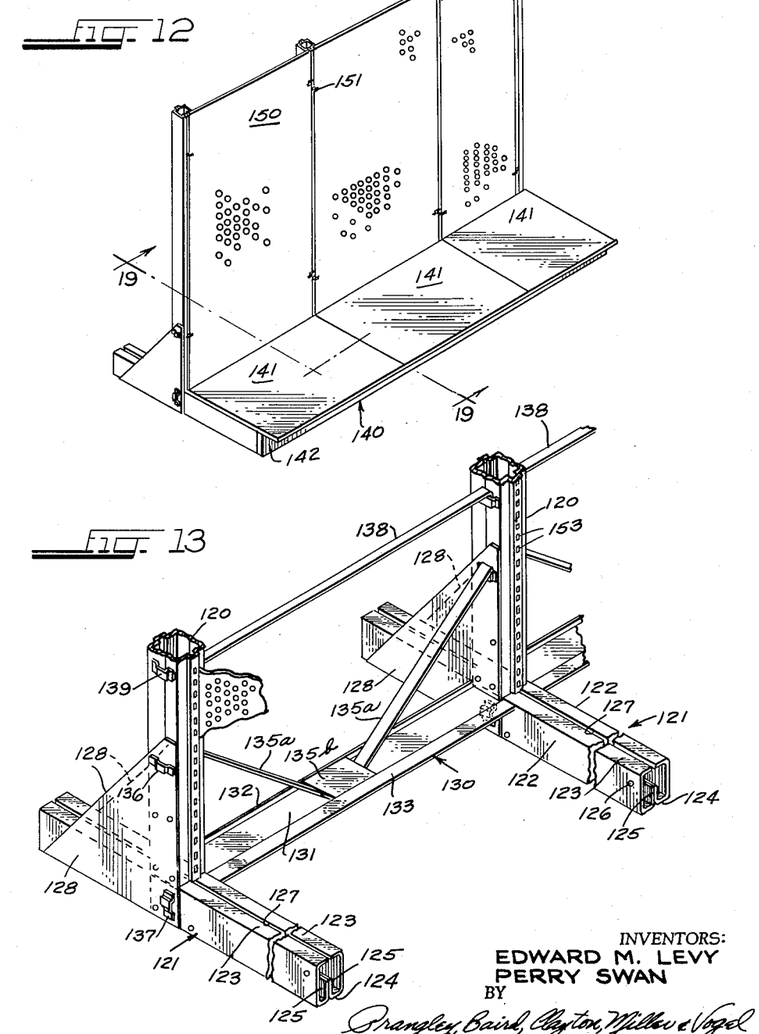
FIG. 12 is a perspective view of a display assembly illustrating an alternative embodiment of the invention.
FIG. 13 is a perspective view of a portion of the framing included in the display apparatus of FIG. 12.

In all three of the illustrated embodiments of the invention the overall display apparatus includes any desired number of like units which are readily assembled to form display apparatus of any desired length. Thus the overall apparatus may consist of three units, as illustrated in FIGS. 1 and 12, or it may consist of a single unit or a large number of units. Furthermore, the individual units comprise vertical frame members and readily connectible and detachable intermediate members extending between successive vertical frame members.

Referring now to the island type display apparatus illustrated in FIGS. 1–11 and 18, the frame work of the apparatus includes a plurality of base upright frame units, each of which consists primarily of a vertical post or standard 20 and a foot 21 comprising a pair of generally channel shaped members 22. More particularly, the upper edge of each member 22 has an inwardly directed flange 23 characteristic of a channel member, whereas the lower edge has an inwardly directed flange 24 and a further flange 25 extending upwardly from the free edge of the flange 24. The flanges 25 of associated channel members 22 are arranged to abut each other and may be secured to each other as by spot welding. If desired, openings (not shown) may be provided in the walls of the channel members 22 to permit easy access to the flanges 25 so that they may conveniently be welded together. The two channel-like members 22 of each foot 21 are also held in fixed orientation with respect to each other by two pairs of pins 26. These pins are preferably welded between the two associated channel members 22, a pair of the pins being arranged at opposite ends of each foot member 21. The upper flanges 23 preferably do not abut each other but are spaced apart to provide a slot 27 therebetween for reasons explained below.

Figures 7, 8, 9:
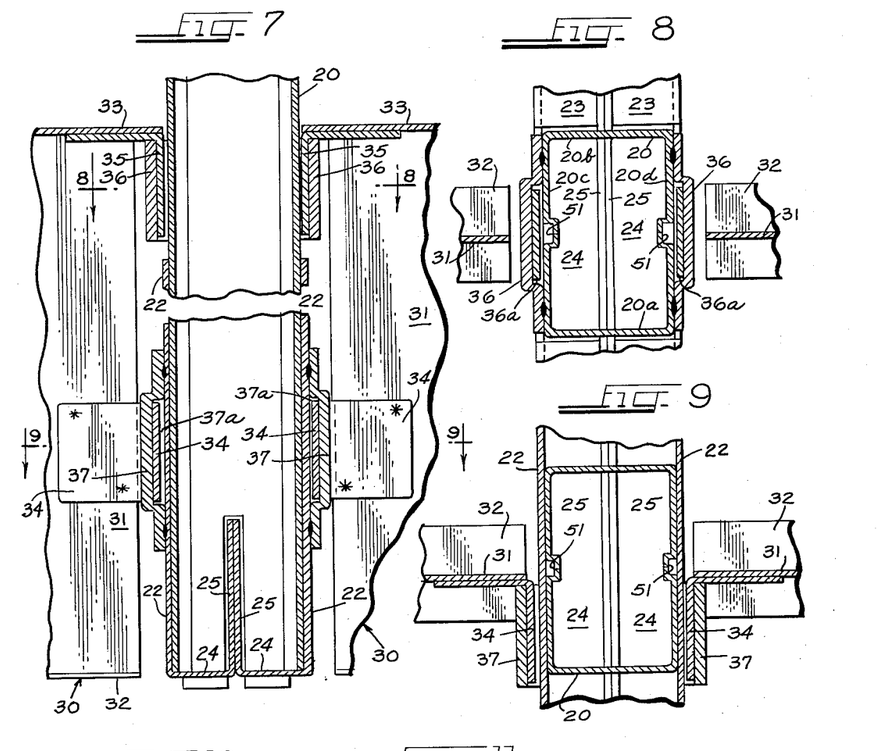
FIG. 7 is a greatly enlarged fragmentary vertical cross-sectional view taken substantially along the line 7—7 in FIG. 2, showing how the upright post or standard is mounted within the transversely extending foot of each base upright unit and showing how the bridge members of FIGS. 5 and 6 are joined to the opposite sides of each foot.
FIG. 8 is a horizontal cross-sectional view taken substantially along the line 8—8 in FIG. 7.
FIG. 9 is a similar view taken substantially along the line 9—9 in FIG. 7.

The upright post or standard 20 of each inverted T-shaped upright frame unit is preferably of generally rectangular horizontal cross-section. The flanges 23 of the associated foot members are cut away to permit insertion of the lower end of the post 20 into the space between the vertical walls of the foot members 22, the various parts being so dimensioned that the post 20 fits snugly between the vertical walls of the foot members, as best seen in FIGS. 7–9. The front and rear walls of the post 20 are slotted at their lower ends to receive the vertical flanges 25 of the foot members 22, and the post 20 is preferably secured to the foot 21 by spot welding the same to the walls of the channel members 22.

Successive or adjacent ones of the inverted T-shaped frame units are rigidly held in fixed orientation by interconnecting bridge members 30. These bridge members are preferably of the form best illustrated in FIGS. 5 and 6. As there illustrated, each interconnecting bridge member 30 includes a vertical web 31 whose lower edge is bent and folded, as clearly shown in FIG. 6, to form a double flange 32 to increase the rigidity of the web. The rigidity of the web may also be increased by embossments 31a, such as are shown only in FIG. 3, and by the formation of flanges 31b at the opposite ends of the web. The upper edge of the web 31 is turned to provide a flange 31c to which there is spot welded or otherwise secured an inverted channel-like member 33 having outwardly extending flanges 33a formed on its opposite side edges.

Figure 6:
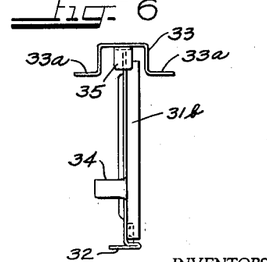
FIG. 6 is an end view of the bridge member of FIG. 5.

A pair of L-shaped hook members 34 are respectively spot welded or otherwise secured to the web 31 at its opposite ends so that one leg of each L-shaped hook member extends laterally from the web, and a pair of similar L-shaped hook members 35 are respectively secured, as by spot welding, to the underside of the channel-like member 33 at its opposite ends, the free legs of the hook members 35 extending downwardly, particularly as seen in FIG. 6.

Figure 4:
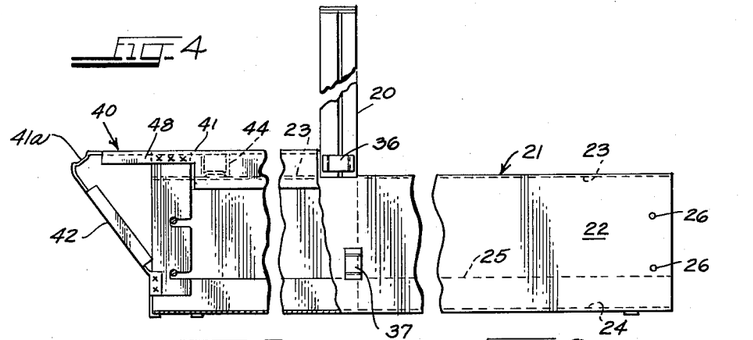
FIG. 4 is an end view of the frame of FIG. 2 with one platform element shown in position thereon, a portion of the frame structure being broken away to illustrate how the platform element is received thereon.
Figure 5:
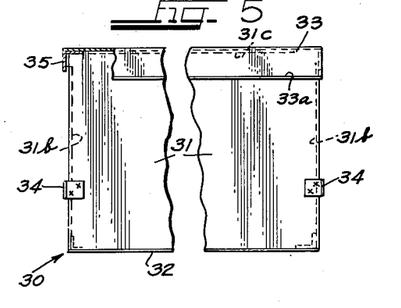
FIG. 5 is a detailed elevational view of a connecting or bridge member which is a part of the frame structure shown in FIGS. 2 and 3 and which serves to join together the succeeding base upright units of the frame.

As best seen in FIGS. 4, 7 and 8, keepers 36 are secured to the opposite sides of each post 20, these keepers being in the form of bent straps which form slots 36a for receiving the hooks 35. Similar keepers 37 are secured to the outer side of each foot member 22 for receiving the laterally extending hooks 34. The keepers 36 and 37 are preferably spot welded to the posts and foot members respectively.

Figure 10:
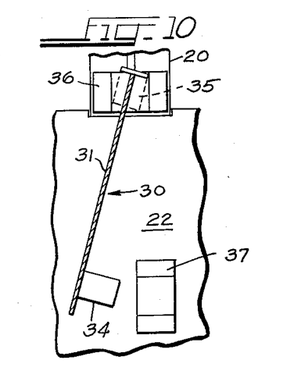
FIG. 10 is a fragmentary schematic cross-sectional view showing how the bridge member of FIGS. 5 and 6 is received in brackets provided on the sides of the upright posts or standards during the erection of the frame, this schematic view showing the structure much as it would be seen if viewed along the line 10—10 of FIG. 2.
Figure 11:
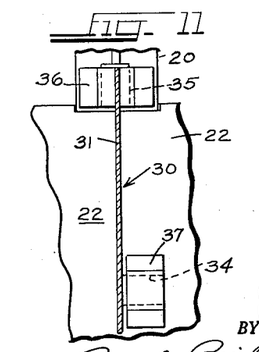
FIG. 11 is a similar view, but showing the assembled position to which the bridge member is pivoted from its position illustrated in FIG. 10.

The interconnecting bridge members 30 may be respectively removably secured to two adjacent vertical inverted T-shaped frame assemblies in the manner illustrated schematically in FIGS. 10 and 11. With two adjacent vertical frame assemblies properly positioned with respect to each other, the hooks 35 at the opposite ends of an interconnecting bridge member 30 may first be inserted into corresponding keepers 36. The slots 36a provided by the keepers 36 are wider than the hooks 35 in order that the interconnecting member 30 may be tilted or pivoted, as illustrated in FIG. 10, to avoid interference between the hooks 34 and the keepers 37. With the hooks 35 fully inserted into the keepers 36, the hooks 34 will lie opposite the keepers 37, whereby the interconnecting bridge member 30 may be brought to its normal vertical position illustrated in FIG. 11. The hooks 34 are thereby caused to enter slots 37a formed by the keepers 37. Any number of additional vertical frame assemblies may be added through the use of additional interconnecting bridge members 30 to form a frame structure extending to any desired length.

Figure 18:
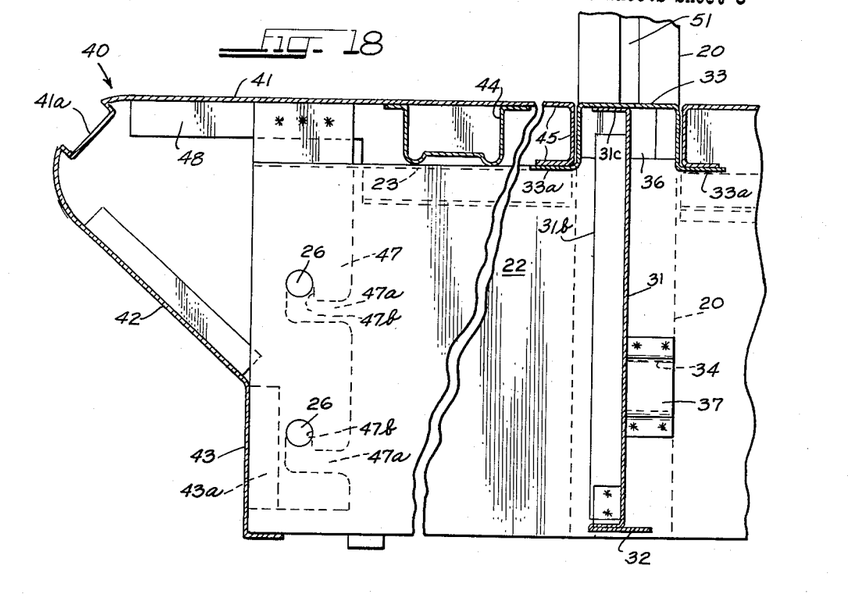
FIG. 18 is a greatly enlarged partial cross-sectional view taken in the direction of the arrows on the line 18—18 of FIG. 1.

The base platforms of the display apparatus may then be completed by the addition of platform members 40. Each platform member 40 may consist primarily of a metal sheet bent to form a platform surface 41, an inwardly sloping front apron 42 and a vertically depending kick panel 43. Secured to the under side of the platform 41 and extending longitudinally the full length thereof there are one or more channel members 44 which serve to stiffen the platform 41 and are adapted to rest upon the upper edges or flanges 23 of two foot members 22 of adjacent feet 21. As illustrated in FIG. 18, the inner edge of the platform 41 is bent downwardly and then outwardly to form a channel 45 which is adapted to rest upon the flange 33a of the associated interconnecting member 30. It should be noted that the various parts of the apparatus are so dimensioned that the flange 33a is flush with the top of the foot members 22, and that the channel 45 formed at the inward edge of the platform 41 is of the same depth as the channel member 44 whereby the platform 41 may be supported in a horizontal plane by associated foot members 22 and the associated interconnecting bridge member 30.

Each of the opposite side edges of each platform 41 is bent downwardly to form a downwardly extending flange 48, and an inturned horizontally extending flange 48a is formed on the lower edge of each flange 48 along most of its length, the inturned flanges 48a being adapted to underlie the flanges 23 of the channel shaped foot members 22, as will presently be more fully explained. A pair of rigid plates 47 are respectively secured at their upper ends to the downwardly directed flanges 48 adjacent the forward ends of the latter, as by spot welding, and the plates 47 at their lower ends are spot welded to inturned flanges 43a formed at opposite ends of the kick plate 43. The inner edge of each plate 47 is provided with one or more slots 47a corresponding to the pins 26, the inner end of each slot having an upwardly off-set seat portion 47b of a size for receiving one of the pins 26.

When the desired number of frame units have been assembled as shown in FIG. 2 and as described above, the proper number of platform units may then easily be slid into place on the frame units. In so doing, a platform unit 40 is brought to position wherein the two downwardly extending side flanges 48 thereof are in alignment with the slots 27 between the flanges 23 of an adjacent pair of feet 21. The platform unit is then pushed rearwardly toward the bridge member 30 which connects the two feet 21, the two flanges 48 of the platform entering the two slots 27 and moving rearwardly therein, with each inturned flange 48a passing beneath and underlying a flange 23 of each foot. During this rearward movement of a platform, the lower surfaces of the channel 45 at the rear of the platform and the lower surface of the reinforcing channel or channels 44 of the platform may ride or slide along the upper surfaces of the flanges 23 of the feet. When the platform has been pushed rearwardly to the point where the forward edges of the rigid plates 47 are about to come into contact with the pins 26, the outer end of the platform may be manually raised slightly to align the slots 47a of the plates 47 with the pins 26. Further rearward movement of the platform will cause the slots 47a to receive the pins 26. As the channel 45 at the rear of the platform reaches and comes into contact with the channel member 33 of the bridge member 30, the pins 26 will have reached the rear of the slots 47a in the plates 47, whereupon the weight of the outer end of the platform will cause the pins to enter the off-set seat portions 47b of the slots 47a, thereby locking the platform against further movement inwardly or outwardly. When the platform has thus been seated upon and received by the foot units 21, it will be understood that the inturned flanges 48a, which underlie the flanges 23 of the feet, will prevent any appreciable vertical raising of the platform, although the outer end of the platform may at any time be lifted slightly so that the pins 26 will be withdrawn from the seat portions 47b of the slots 47a, thereby permitting the platform to be slipped outwardly to remove the platform.

It will be understood that when the invention is embodied in an island type structure of the form best seen in FIGS. 1 and 2, the several platforms will be slipped into place on opposite sides of the assembly in the manner described above. It will also be understood, of course, that while the platform units 40 illustrated are shown to have a width which spans the distance between two next adjacent foot units 21, the platform units may have a width equal to any multiple of that space so that a single platform may span two or more foot units 21. The distance between foot units 21 may also be varied by using bridge members 30 of different lengths, providing platform units of proper width are employed, the requirement always being that the side flanges 48 of the platform units will align with and be received by the slots 27 of the foot units. It will be apparent that the slot 27 in the upper side of each foot unit 21 must be wide enough to receive two flanges 48 and two plates 47, one for each of the two platform units 40 associated therewith. Preferably the flanges 48 extend over the plates 47, and the slots 27 snugly receive two plates 47 and the flanges 48 such that the edges of adjacent platform units 40 are held substantially flush against each other. Furthermore, the various parts are preferably so dimensioned that the flange 33 at the top of the interconnecting bridge member 30 is of the same height as the channel 45 formed at the inner edge of the platform unit 40, and this channel member firmly abuts the flange 33 when the cover member 40 is assembled with the framework. A smooth and continuous flat surface is thereby presented by the plurality of platforms 40 and flanges 33. Furthermore, the presence of the channels 45 of the platform units in contact with the channels 33 of bridge members 30 and overlying the flanges 33a thereof locks the bridge members in place. This is particularly true of the channels 45 at the inner ends of those platform units overlying that flange 33a which would have to raise if the bridge members were sought to be pivoted in a direction that would remove the locking brackets 34 from the lugs 37.

In the form of the invention shown in FIG. 1, the ends of the structure may be finished off by end boxes 49 which are formed to match the platform units 40 and are arranged to extend entirely across the ends of the assembly. The inner edge portion of the platform surface 49a of each end box 49 may be turned downwardly to provide a depending flange (not shown) corresponding to the flanges 48 of the platform units 40 which will be received in the slot 27 of the endmost foot unit 21, the central portion of the platform surface 49a being notched, as at 49b, to provide clearance for the endmost upright member 20. Each of the end boxes 49 may also have at one of its ends a plate (not shown) corresponding to the plates 47 of the platform units 40, which may engage one or more of the pins 26 at one end of the endmost foot member 21, thereby retaining the end boxes in position on the assembly.

The upright posts 20 are tubular and of generally rectangular cross-section having front and rear walls 20a and 20b and opposite side walls 20c and 20d (see FIG. 8). The front and rear walls 20a and 20b are provided with one or more vertical rows of spaced slots (FIGS. 1 and 2) for receiving hooks and brackets of any well known construction for supporting merchandise, shelves, etc. An important feature of the invention resides in the particular formation of the upright posts 20 for retaining panels therebetween. To this end, it will be observed, particularly in FIGS. 2, 8 and 9, that the side walls 20c and 20d of each post 20 are each provided with a relatively deep longitudinally extending recess 51 which extends along the entire length of the post, these recesses being of sufficient and proper width and depth slidably to receive and retain the opposite side edges of panels 50. The panels 50 may be of the peg-board type or they may be plain or decorative in nature. In any event, the panels may be inserted in the completed frame work, before or after the installation of the platform units 40 and the end boxes 49, simply by sliding them downwardly into the recesses 51. In the alternative, the panels may be slipped into the recesses at the time the frame is assembled. In both cases, the recesses 51 hold the panels firmly in place to provide an upright wall which may be of any desired length, depending upon the number of frames units employed, and which may be used for decorative purposes or for supporting merchandise thereon.

Figure 3:
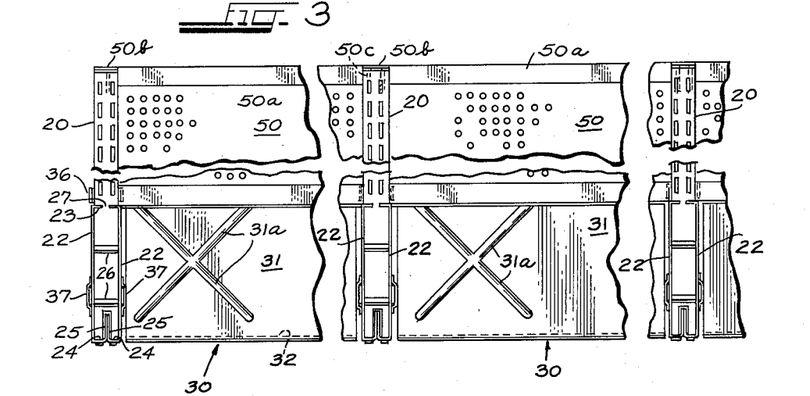
FIG. 3 is a front elevational view of the frame portion of FIG. 2, showing fragmentary portions of the upright panels that are removably retained between the upright posts of the frame units.

When the panels 50 have been received in the recesses 51 of the upright standards or posts 20, the upper edge of the assembly may be finished off by the use of finishing caps 50a and 50b, as shown particularly in FIGS. 1 and 3. The caps 50a may comprise elongated inverted channel members which slip downwardly over the upper edge portions of the panels 50, the opposite ends of the channel members, if desired, being provided with L-shaped brackets, one leg 50c of each of which may be inserted downwardly into the upper end of the associated upright post 20. After the channel-like caps 50a have been applied, the caps 50b may be installed, these caps comprising metal plate conforming to the size of the upper ends of the upright posts 20 and overlying the same. The caps 50b may be retained in place on the upper ends of the posts 20 in any suitable manner, as for example by leaf spring-like depending legs (not shown) which may extend downwardly into the associated post 20 and bear against the inner surfaces of the post.

The outer edge of each of the platform surfaces 41 of the platform units 40 may be formed to provide a longitudinally extending recess 41a therein (shown in FIG. 18), within which suitable cards or the like bearing merchandise prices or other information may be arranged.

As indicated hereinabove, there is shown in FIG. 20 a perspective view of the framing for a modified form of the apparatus of the present invention. This particular modified form of the apparatus is identical to that shown in FIG. 1 and in FIGS. 2 to 11 and 18 except for the fact that platform units 40 will be used thereon on only one side of the vertical, longitudinal extending wall provided by the several upright posts 20 and the intervening panels 50. The only change involved in the modified frame assembly is the shortening of the foot units 21, as illustrated in FIG. 20, so that each foot unit in combination with its corresponding upright post 20, forms an L-shape rather than the inverted T-shape. This modified form of the invention is particularly adapted for use and disposition along an existing wall or for use in cases wherein the several panels 50 are intended to form a false wall having platform units 40 along only one of its sides. In view of the fact that the frame structure for the modification of the invention shown in FIG. 20 is identical to the frame structure for the form of the invention shown in FIGS. 1 to 11 and 18, with the exception just indicated, the same reference numerals have been applied to corresponding parts and a detailed description of the modified framing is obviously unnecessary here.

It will be appreciated from the foregoing description of the two embodiments of the invention shown in FIGS. 1 to 11, 18 and 20 that the assembly and disassembly of the structures may be quickly and easily carried out without the use of any tools whatsoever and by unskilled workmen. In assembling the structures the workmen merely move to the desired location a suitable number of foot and upright post units 20, 21, the bridge members 30, the panels 50, and the platform units 40. These elements may quickly be assembled in the manner discussed above with the assembly located at the particular place desired in the store or display space. Later, if it should be desired to disassemble the structure for any reason whatsoever, the disassembly may quickly be carried out merely by slidably removing the platform units 40, whereupon the bridge members 30 may quickly be disengaged from the lugs 36 and 37, and the removal of the panels 50 may quickly and easily be accomplished. When this has been done the structure will be in a complete state of dissassembly and the various parts thereof may be returned to storage or may be used in the assembly of another structure or structures which will, in effect, provide a redecoration or a remodeling of the store or display space.

As indicated previously herein, the embodiment of the invention illustrated in FIGS. 12 to 17 and 19 is also completely self-supporting and is intended to be used along an existing wall or other obstacle, or to provide a false wall or divider having a raised platform along only one of its sides.

As in the earlier described embodiments of the invention, the display apparatus of FIGS. 12 to 17 and 19 includes a plurality of vertical base upright frame units, each comprising an upright post 120 and a foot 121. Also, each foot unit 121 is formed of a pair of channel-like foot members 122 of the same general form as the foot members 22 except that their vertical dimension may be substantially less than that of the members 22. More particularly, each foot member 122 includes a top flange 123, a lower flange 124 and an additional flange 125 extending upwardly from the free edge of the flange 124, the flanges 125 being welded together so that the upper flanges 123 of each pair of members 122 are separated to provide a slot 127. A single pin 126 extends transversely between, and is secured to, the foot members 122 near the forward end of each foot 121. The flanges 123 of each foot 121 are cut away to receive the lower end of a post 120 whereby the post may be secured to the associated foot 121 as by welding. The post 120 is secured to the associated foot 121 at a point considerably closer to the rear end of the foot than to the front end thereof. The length of the foot 121 extending to the rear of the post 120 is only of such magnitude as to provide the desired degree of stability for the completed apparatus. The rigidity of the connection between each upright post 120 and its associated foot 121 may be increased by the use of rearwardly extending triangular gusset plates 128 which may be welded or otherwise secured to the opposite sides of each upright post 120 and the foot members 122 comprising the foot 121. The presence of such gusset plates is not objectionable because, as will be seen, they are on the rear side of the assembly and will be hidden by the panels later installed.

Interconnecting bridge members 130 are provided which extend between and are secured to adjacent vertical frame members. Each interconnecting member 130 includes a horizontal web 131 and is bent upwardly along the rear edge to form a stiffening flange 132. The forward edge of the interconnecting member 130 is bent upwardly and then forwardly to form a runner or ledge 133.

Figure 14:
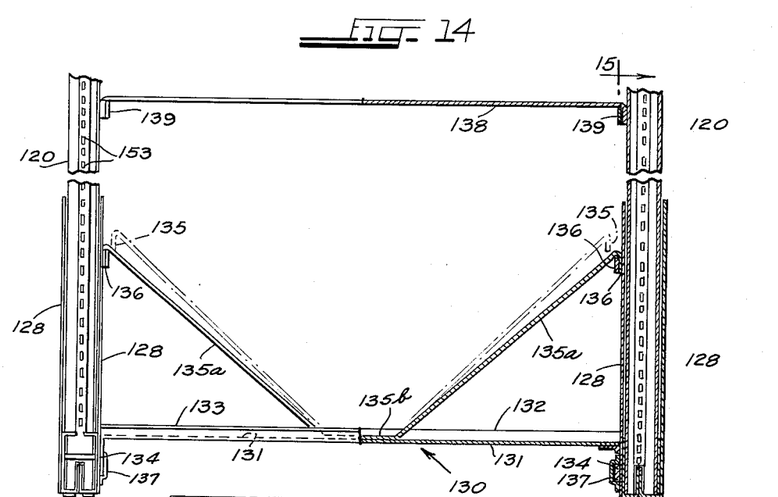
FIG. 14 is a front elevational view of the portion of the frame illustrated in FIG. 13.

At each end of the interconnecting member 130 there is provided a horizontally and then downwardly extending hook 134. A second pair of hooks 135 is also provided, as best seen in FIG. 14. These latter hooks are connected by elongated arms 135a to a yoke 135b which is firmly secured, as by welding, to the web 131 near the center of the interconnecting bridge member 130. A keeper 136 in the form of a bent strap is spot welded to each gusset plate 128, these keepers forming slots for receiving the hooks 135. Other keepers 137 are secured to the gusset plates for receiving the hooks 134.

Figures 15, 16, 17:
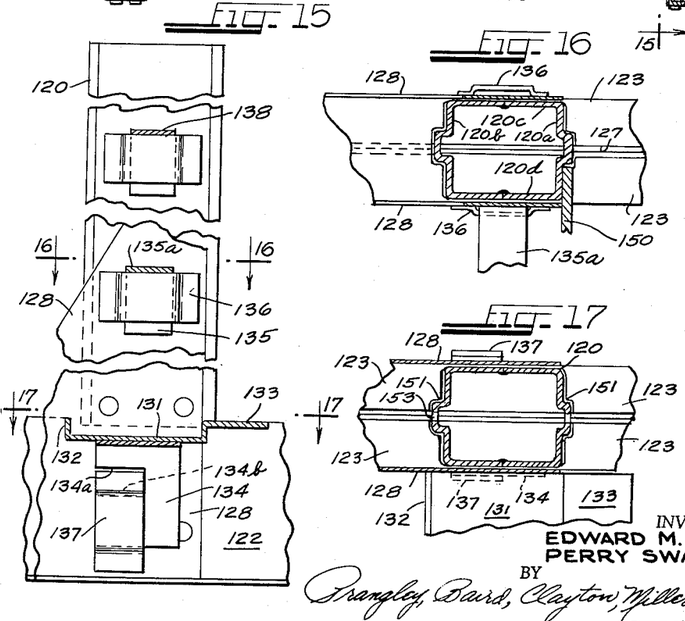
FIG. 15 is an enlarged cross-sectional view taken in the direction of the arrows on the line 15—15 of FIG. 14.
FIG. 16 is a cross-sectional view taken in the direction of the arrows on the line 16—16 of FIG. 15.
FIG. 17 is a cross-sectional view taken in the direction of the arrows on the line 17—17 of FIG. 15.

As best seen in FIG. 15, the downwardly extending portion of each hook 134 has its rear edge slotted as at 134a so as to provide at its lower end a rearwardly directed hook element 134b which is adapted to be received in a rearwardly direction into the keeper 137. Thus, in order to assemble an adjacent pair of base uprights 120, 121, a bridge member 130 is arranged between the two base uprights. The two hooks 135 of the bridge member are first inserted downwardly into the keepers 136, and the main body portion of the bridge member 130 is then, in effect, moved or pivoted bodily in a rearward direction to cause the hook elements 134b of the hooks 134 to enter into the slots provided by the respective keepers 137. The slots provided by the keepers 136 may be somewhat larger than the hooks 135, as best seen in FIG. 15, in order to permit this pivotal body movement of the bridge member 130, or the arms 135a of the yoke may be sufficiently resilient to permit the movement which brings the hook elements 134b into position within the keepers 137. The engagement of the hooks 135 in the respective keepers 136 and the engagement of the hook elements 134b in the respective keepers 137 thus secures together the adjacent pair of the base uprights 120, 121 in an upright parallel position. The disposition of the base upright units in this position may be reinforced by a transversely extending reinforcing strap or tie bar 138, the opposite ends of which are bent or formed downwardly to provide hook elements adapted to engage keepers 139 which may be spot welded or otherwise secured to the opposite side walls of the upright posts 120.

It will be appreciated that the installation of a bridge member 130 and the installation of the reinforcing strap or bar 138 between any adjacent pair of base uprights 120, 121 may be quickly accomplished in the manner just described without the use of any tools whatsoever.

A platform unit 140 is arranged to extend between or span the space between adjacent foot units 121, each platform unit comprising a generally rectangular platform 141 having a downwardly directed kick plate or board 142 thereon. The platform 141 and the kick board 142 may be constructed of wood, if desired. A pair of elongated generally triangularly shaped and downwardly extending metal plates 148 are respectively secured to the opposite side edges of each of the platforms 141 as by screws 148b (FIG. 19), the lower edge of each plate 148 being turned inwardly along most of its length to provide an inwardly directed flange 148a. The width of each platform member 141 is such that when the platform is disposed in front of a pair of foot units 121, the two plates 148 on the opposite side edges of the platform 141 will be in alignment with the slots 127 provided between the upper flanges 123 of the foot units. Thus, each platform unit 140 may be slid rearwardly onto the respective foot units 121 in substantially the same manner described above with respect to the other embodiments of the invention, the plates 148 being received by the slots 127 with the respective flanges 148a thereof being received beneath and underlying one of the flanges 123 of each foot unit 121.

Figure 19:
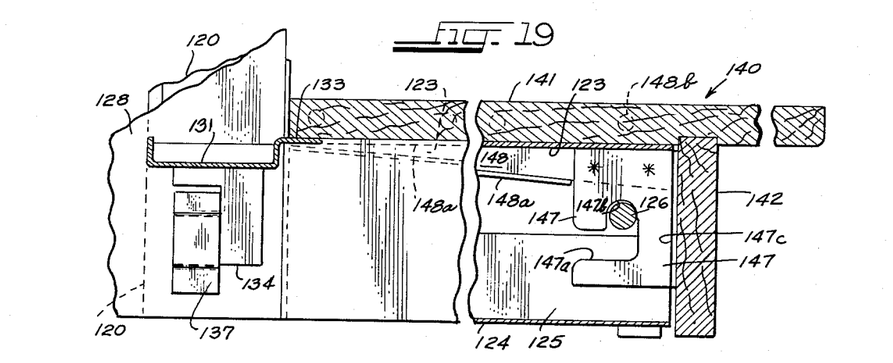
FIG. 19 is a greatly enlarged cross-sectional view taken in the direction of the arrows on the line 19—19 of FIG. 12.

Each of the inwardly turned flanges 148a on the plates 148 on the opposite side edges of the platforms 141 is terminated short of the outer end of the plate 148 so as not to interfere with a rigid depending bracket 147 that is welded to each plate 148, as shown in FIG. 19. The forward edge of each bracket 147 is provided with a rearwardly directed slot 147a which terminates in an upwardly directed seat 147b into which one of the pins 126 is adapted to be received when the platform unit has been slid inwardly on the foot units 121. In sliding the platform units 140 rearwardly on the foot units 121 the platforms ride on the respective flanges 123 of the foot units until the forward edges of the brackets 147 reach the pins 126, whereupon the outer end of the platform may be raised slightly to cause the pins 126 to be received in the slots 147a and thus into the seats 147b provided therein. It will be observed that the diagonal disposition of the inwardly turned flanges 148a permits the lifting of the outer ends of the platforms for this purpose. However, the disposition of the flanges 148a beneath the flanges 123 of the foot units 121 prevents upward tilting of the platforms in the event a heavy weight is placed upon the outer edge of the platforms or any one thereof.

The rear edge of each bracket 147 has an inwardly turned flange 147c formed thereon to which the kick plate or board 142 may be suitably secured by means of screws or the like (not shown).

It will be observed, particularly from FIG. 19, that when each platform unit 140 has been slid home on the respective foot units 121, the inner edge of each platform 141 will move over and overlie the runner 133 on the forward edge of the corresponding bridge member 130. This disposition of the runner 133 beneath the inner edge of the platform 141 prevents disengagement of the hook elements 134a of the hooks 134 from the keepers 137. Thus, the sliding home of the platform units 140 into place in the assembly actually locks and secures the assembly together.

An important feature of the embodiment of the invention just described resides in the particular form and construction of the upright posts 120. As perhaps best seen in FIGS. 13 and 16, the upright posts are of generally rectangular cross-section having front and rear walls 120a and 120b, respectively, and opposite side walls 120c and 120d. The front and rear walls of the upright posts have one or more vertical rows of vertically spaced slots 153 therein into which suitable hooks, racks or brackets may be inserted for the purpose of supporting merchandise or the like. The forward and rear faces of the upright posts, moreover, are sharply recessed on opposite sides of the rows of slots for the purpose of receiving in the recesses the edges of panels 150 that are arranged in spanning relationship with respect to adjacent posts 120. The depth of the recessed faces on opposite sides of the rows of slots is preferably the same as the thickness of the panels 150, as best illustrated in FIG. 16, so that the forward face of each panel will be flush with the forwardmost portion of the wall 120a or the wall 120b, as the case may be, in which the row or rows of slots 153 are formed. The panels 150 may be installed after the framework has been fully erected and after the platform units 140 have been moved into place, the several panels 150 being retained in position between and in the recesses of adjacent upright posts 120 by means of suitable clips 151 (FIG. 12) which may be hooked over the lower edges of selected ones of the slots 153 and which have body portions overlying the forward faces of the adjacent panels 150.

As is the case with respect to the embodiments of the invention illustrated in FIGS. 1 to 11, 18 and 20, the embodiment of the invention shown in FIGS. 12 to 17 and 19 may be quickly and easily assembled or disassembled by unskilled persons without the use of tools. Furthermore, the assembly may be erected in any desired length merely by adding to the assembly a suitable number of bridge units 130 and a suitable number of upright base units 120, 121, together with the required platform units 140 and the panels 150, the latter of which may be of the pegboard type or may be of a purely decorative style. It will be appreciated, of course, that the spacing between adjacent upright posts 120 may be varied by employing bridge units 130 of different lengths together with panels 150 and platform units 140 of appropriate widths. Similarly, it will be appreciated that any one platform unit 140 may span any desired number of the foot units 121, it being required only that the width of the platform units be such that their downwardly depending side plates 148 be properly aligned with the slots 127 of the foot units so as to permit the platform units to be properly slid rearwardly into place.

It will be understood that numerous variations may be made in the manner in which the assemblies described above may be used. For example, there may be installations desired wherein the panels will be omitted. This omission of the panels may be made, for example, particularly where an "island" type arrangement is employed such as shown in FIG. 1. In such an arrangement it may be desired to have an "open" island assembly which will not obstruct the vision and through which merchandise on both sides of the assembly may be seen from either side thereof. When this arrangement is desired one need only omit the installation of the panels 50. Since the panels themselves play no part in establishing the rigidity of the assembly, their omission will not weaken the structure in any way. With the panels omitted, merchandise may be rested on the platforms or supported in any desired manner by means of brackets and shelves attached to the upright posts 20, all in plain view of a customer from either side of the assembly.

The foregoing description of three embodiments of the present invention have been given for purposes of explanation only and no unnecessary limitations should be inferred therefrom, for it will be apparent to those skilled in the art that additional variations and changes may be made in the invention within the spirit and scope of the appended claims.

We claim:

1. Display apparatus providing a base and a wall for displaying merchandise, comprising a plurality of vertical frame members each including an elongated foot having two spaced apart vertical walls defining a longitudinally extending slot in the upper surface thereof and a vertical post secured within said foot and extending upwardly therefrom, an interconnecting member extending between each two adjacent vertical frame members and connected at each of its ends to said frame members by a pair of vertically spaced hooks and cooperating keepers, said pair of hooks at each end of said interconnecting member extending in directions generally perpendicular to each other and parallel to the general plane of the associated frame member, whereby said hooks and keepers are engageable and disengageable only upon misalignment of said interconnecting member, said interconnecting member having a longitudinally extending horizontal runner displaced from the line of said posts, a cover member extending between each two adjacent vertical frame members and extending from said posts over the ends of said feet of the associated ones of said frame members and defining a platform, said cover member having a depending flange at each side edge thereof adapted to enter said slots in said feet and to underlie the edges of said slots to retain said cover on said feet, and a wall panel extending between and supported by each two adjacent ones of said posts.

2. Display apparatus for providing an upstanding wall upon which merchandise and the like may be supported for display, comprising at least a pair of separate upright frame members each including an upstanding post, an interconnecting frame unit disposed between said pair of upright frame members, means for removably securing the opposite ends of said intermediate frame unit to said pair of upright frame members, said securing means including a downwardly extending hook on the upper portion of each end of said intermediate frame unit, a laterally extending hook spaced below said downwardly extending hook on each end of said intermediate frame unit, the direction of projection of said downwardly extending and laterally extending hooks being substantially normal to each other, keepers on said upright frame members for receiving and pivotally retaining said downwardly extending hooks, and additional keepers on said upright frame members below the respective first mentioned keepers for slidably receiving said laterally extending hooks while said first mentioned keepers pivotally retain said downwardly extending hooks.

3. Display apparatus providing a base and a wall for displaying merchandise, comprising a plurality of vertical frame members each including an elongated foot having two spaced apart vertical walls defining a longitudinally extending slot in the upper surface thereof and a vertical post secured within said foot and extending upwardly therefrom, an interconnecting member extending between each two adjacent vertical frame members and detachably connected to each of said frame members, a cover member extending between each two adjacent vertical frame members and extending from said posts to the ends of said feet of the associated ones of said frame members and defining a platform, said cover member including an apron extending downwardly over the ends of said feet, a pair of plates depending from said cover and adapted to enter said slots in said feet, each of said plates being secured to both said platform and said apron, each of said feet having a pin extending between said walls thereof and each of said plates being slotted to receive said pin to lock said cover member to the associated frame members with said cover member resting on said feet, and a wall panel extending between and supported by each two adjacent ones of said posts.

4. Display apparatus providing a base and a wall for displaying merchandise, comprising a plurality of vertical frame members each including an elongated foot having two spaced apart vertical walls defining a longitudinally extending slot in the upper surface thereof and a vertical post secured within said foot and extending upwardly therefrom, an interconnecting member extending between each two adjacent vertical frame members and detachably connected at each of its ends to said frame members by a pair of vertically spaced hooks and cooperating keepers, the pair of hooks at each end of said interconnecting member extending in directions generally perpendicular to each other and parallel to the general plane of the associated frame member whereby said hooks and keepers are engageable and disengageable only upon misalignment of said interconnecting member, a cover member extending between each two adjacent vertical frame members and extending from said posts to the ends of said feet of the associated ones of said frame members and defining a platform, a pair of plates depending from said cover and adapted to enter said slots in said feet, each of said feet having a pin extending between said walls thereof and each of said plates being slotted to receive said pin to lock said cover member to the associated frame members with said cover member resting on said feet, and a wall panel extending between and supported by each two adjacent ones of said posts.

5. Display apparatus providing a base and a wall for displaying merchandise, comprising a plurality of vertical frame members each including an elongated foot having two spaced apart vertical walls defining a longitudinally extending slot in the upper surface thereof and a vertical post secured within said foot near the center thereof and extending upwardly therefrom, an interconnecting member extending between each two adjacent vertical frame members and connected at its opposite ends to said adjacent frame members adjacent to the foot thereof by a pair of fixed, vertically spaced hooks and cooperating keepers, said interconnecting member including a central ledge extending between adjacent posts and a horizontal runner on either side of and below said ledge, a plurality of cover members respectively extending between and resting upon the feet of each two adjacent vertical frame members, said cover members being disposed on both sides of the line of said posts and extending from said posts to the ends of said feet and defining a horizontal platform on both sides of the line of said posts, opposite ones of said cover members extending to and being flush with said central ledge and respectively resting upon said runners, each of said cover members having a depending plate at each side edge thereof adapted to enter said slots in said feet upon which the platform rests, each of said feet having a pin extending transversely between said walls thereof and each of said plates being slotted to receive one of said pins to lock said cover members upon said feet, and a wall panel extending between and supported by each two adjacent ones of said posts.

6. Display apparatus providing a base and a wall for displaying merchandise, comprising a plurality of vertical frame members each including an elongated foot having two spaced apart vertical walls defining a longitudinally extending slot in the upper surface thereof and a vertical post secured within said foot near the center thereof and extending upwardly therefrom, an interconnecting member extending between each two adjacent vertical frame members and connected at its opposite ends to said adjacent frame members adjacent to the foot thereof by a pair of fixed, vertically spaced hooks and cooperating keepers, said pair of hooks at either end of said interconnecting member extending in directions generally perpendicular to each other and parallel to the general plane of the associated frame member whereby said hooks and keepers are engageable and disengageable only upon misalignment of said interconnecting member, a plurality of cover members respectively extending between and resting upon the feet of each two adjacent vertical frame members, said cover members being disposed on both sides of the line of said posts and extending from said posts to the ends of said feet and defining a horizontal platform on both sides of the line of said posts, each of said cover members having a depending plate at each side edge thereof adapted to enter said slots in said feet upon which the platform rests, each of said feet having a pin extending transversely between said walls thereof and each of said plates being slotted to receive one of said pins to lock said cover members upon said feet, and a wall panel extending between and supported by each two adjacent ones of said posts.

7. Display apparatus for providing a base upon which merchandise and the like may be supported for display, comprising at least a pair of separate upright frame members each including an upstanding post, a pair of keepers on each post, an interconnecting frame unit extending between said pair of upright frame members and having at each of its ends a pair of vertically spaced hooks, said pair of hooks at each end of said interconnecting member extending in directions generally perpendicular to each other and parallel to the general plane of the associated frame member and detachably engaging said keepers.

8. In a display apparatus for providing a base upon which merchandise and the like may be supported for display and including a plurality of separate upright frame members each having an upstanding post and an interconnecting frame member extending between each two adjacent upright members; the combination comprising means for removably securing the opposite ends of the intermediate frame member to two adjacent upright members, said securing means including a downwardly extending hook on each end of the intermediate frame member, a laterally extending hook vertically spaced from said downwardly extending hook on each end of said intermediate frame member, the direction of projection of said downwardly extending and laterally extending hooks being substantially normal to each other, keepers on the upright members for receiving and pivotally retaining said downwardly extending hooks, and additional keepers on the upright members vertically spaced from the respective first mentioned keepers for slidably receiving said laterally extending hooks while said first mentioned keepers pivotally retain said downwardly extending hooks.

References Cited in the file of this patent

UNITED STATES PATENTS

| 843,456 | Higbee et al. | Feb. 5, 1907 |
| 1,798,182 | Vance | Mar. 31, 1931 |
| 2,787,382 | Williams | Apr. 2, 1957 |

FOREIGN PATENTS

| 688,218 | Great Britain | Mar. 4, 1953 |
| 926,448 | Germany | Apr. 18, 1952 |